United States Patent
Farzan et al.

(10) Patent No.: US 9,662,690 B2
(45) Date of Patent: May 30, 2017

(54) SYSTEMS FOR MAINTAINING A FUNCTIONAL LINE FOR CONVEYING FLUID AND PIG ASSEMBLIES FOR USE THEREIN

(71) Applicant: Chevron U.S.A. Inc., San Ramon, CA (US)

(72) Inventors: Parsinejad Farzan, Houston, TX (US); Antonio C. F. Critsinelis, Kingwood, TX (US); Sid A. Mebarkia, Sugar Land, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 479 days.

(21) Appl. No.: 14/331,894

(22) Filed: Jul. 15, 2014

(65) Prior Publication Data
US 2016/0018044 A1    Jan. 21, 2016

(51) Int. Cl.
*F16L 55/40* (2006.01)
*B08B 9/055* (2006.01)
(Continued)

(52) U.S. Cl.
CPC ............ *B08B 9/055* (2013.01); *B08B 9/0557* (2013.01); *F16L 55/44* (2013.01); *F16L 2101/12* (2013.01); *F16L 2101/30* (2013.01)

(58) Field of Classification Search
CPC ........ B08B 9/055; B08B 9/0557; F16L 55/44; F16L 2101/12; F16L 2101/30
See application file for complete search history.

(56) References Cited

U.S. PATENT DOCUMENTS

| 4,844,165 A | 7/1989 | Van Der Steeg et al. |
| 5,992,247 A | 11/1999 | Manestar |

(Continued)

FOREIGN PATENT DOCUMENTS

| CN | 203614993 U | 5/2014 |
| JP | 2004290806 | 10/2004 |

(Continued)

OTHER PUBLICATIONS

Search Report, issued on Jan. 8, 2016, during the prosecution of Foreign Application No. GB1512050.4.

*Primary Examiner* — Shay Karls
(74) *Attorney, Agent, or Firm* — Karen R. DiDomenicis

(57) ABSTRACT

Disclosed is a pig assembly for maintaining a multi-diameter functional line with a large range of diameter variation for conveying fluid. The pig assembly includes a central shaft having a first shaft end and a second shaft end and at least one cylindrical pig body coaxially mounted on the central shaft. Attached to the at least one pig body are a plurality of arms capable of moving between an extended position radiating from the at least one pig body and a retracted position within the at least one pig body. Each of the pluralities of arms includes a spring to enable each arm of the plurality of arms to move into the extended position and to store potential energy when the arm is in the retracted position, and a roller to enable rolling contact between the pig assembly and an interior of a functional line during movement of the pig assembly within the functional line. The pig assembly further includes at least one set of a plurality of scraper elements located along the central shaft capable of rotating about the central shaft to move between an opened position and a collapsed position. A method for maintaining a multi-diameter functional line using the pig assembly is also disclosed.

20 Claims, 4 Drawing Sheets

(51) Int. Cl.
*F16L 55/44* (2006.01)
*F16L 101/12* (2006.01)
*F16L 101/30* (2006.01)

(56) References Cited

U.S. PATENT DOCUMENTS

| | | | |
|---|---|---|---|
| 6,538,431 B2* | 3/2003 | Couchman | F16L 55/28 |
| | | | 15/104.061 |
| 6,695,537 B2 | 2/2004 | Spraggon | |
| 7,279,052 B2 | 10/2007 | Kinnari et al. | |
| 7,328,475 B2* | 2/2008 | Smith | F16L 55/28 |
| | | | 134/8 |
| 8,011,052 B2 | 9/2011 | Kapustin et al. | |
| 2007/0174983 A1 | 8/2007 | Smith et al. | |
| 2008/0245258 A1 | 10/2008 | Herron | |
| 2011/0095752 A1 | 4/2011 | Short et al. | |
| 2011/0203676 A1* | 8/2011 | Been | B08B 9/0553 |
| | | | 137/15.07 |
| 2016/0082589 A1* | 3/2016 | Skrinde | B08B 9/049 |
| | | | 700/255 |
| 2016/0136700 A1* | 5/2016 | Schaller | F16L 55/32 |
| | | | 15/104.14 |

FOREIGN PATENT DOCUMENTS

| | | |
|---|---|---|
| WO | WO0184040 | 11/2001 |
| WO | 2011/025255 A2 | 3/2011 |

* cited by examiner

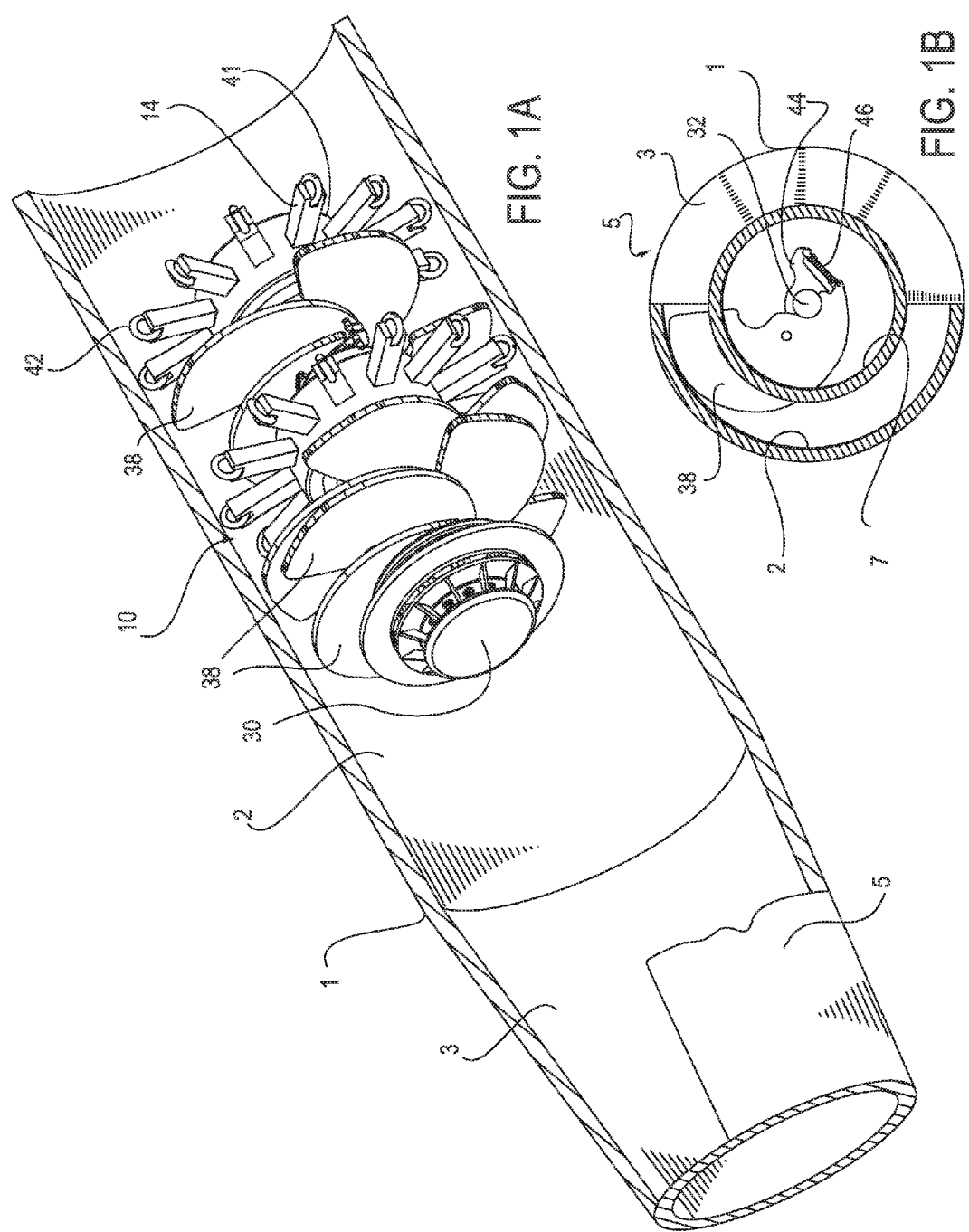

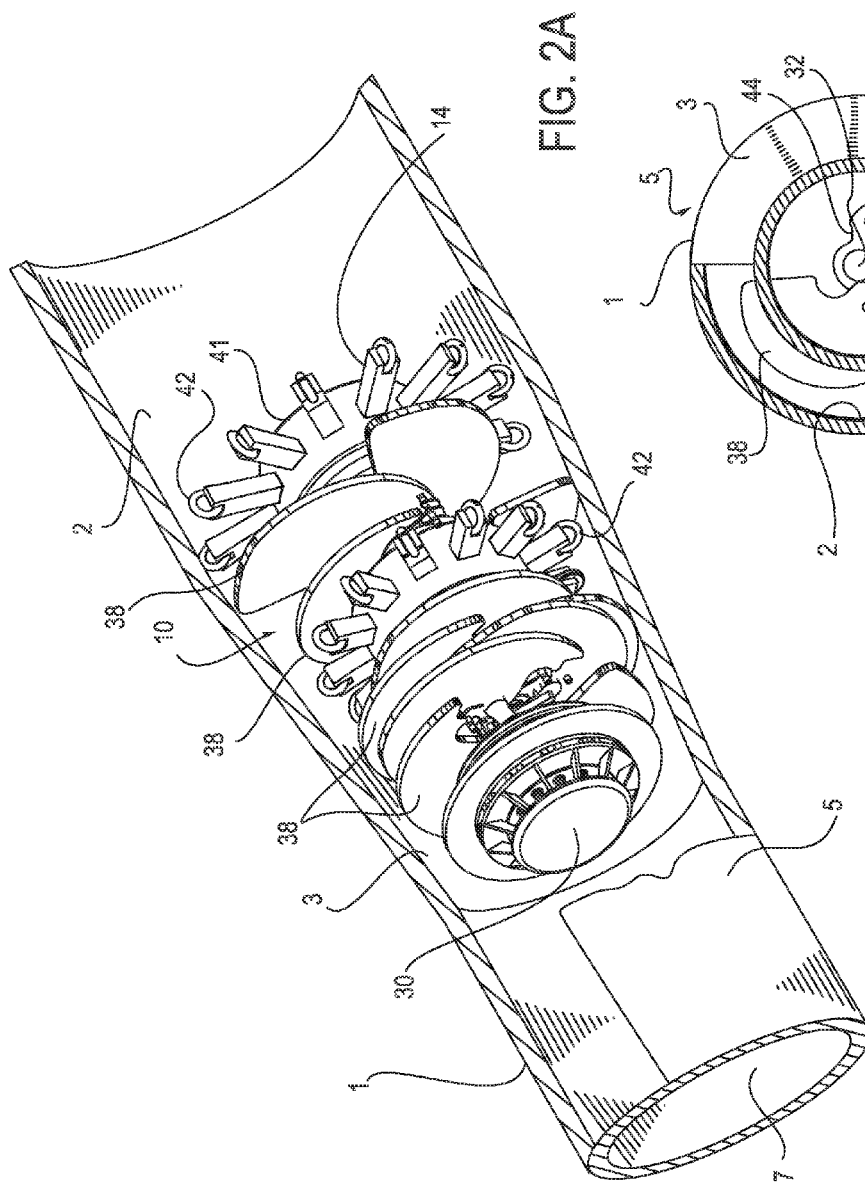
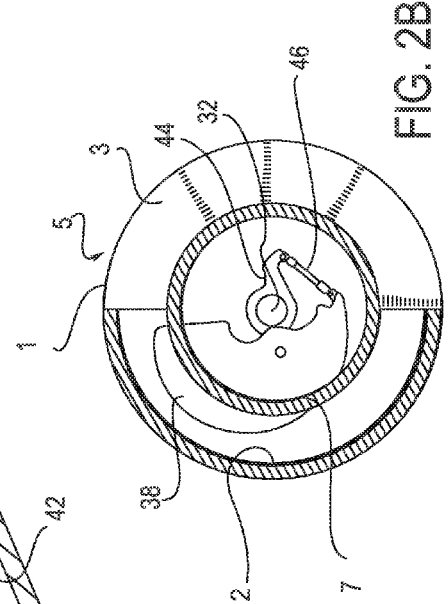
FIG. 2A
FIG. 2B

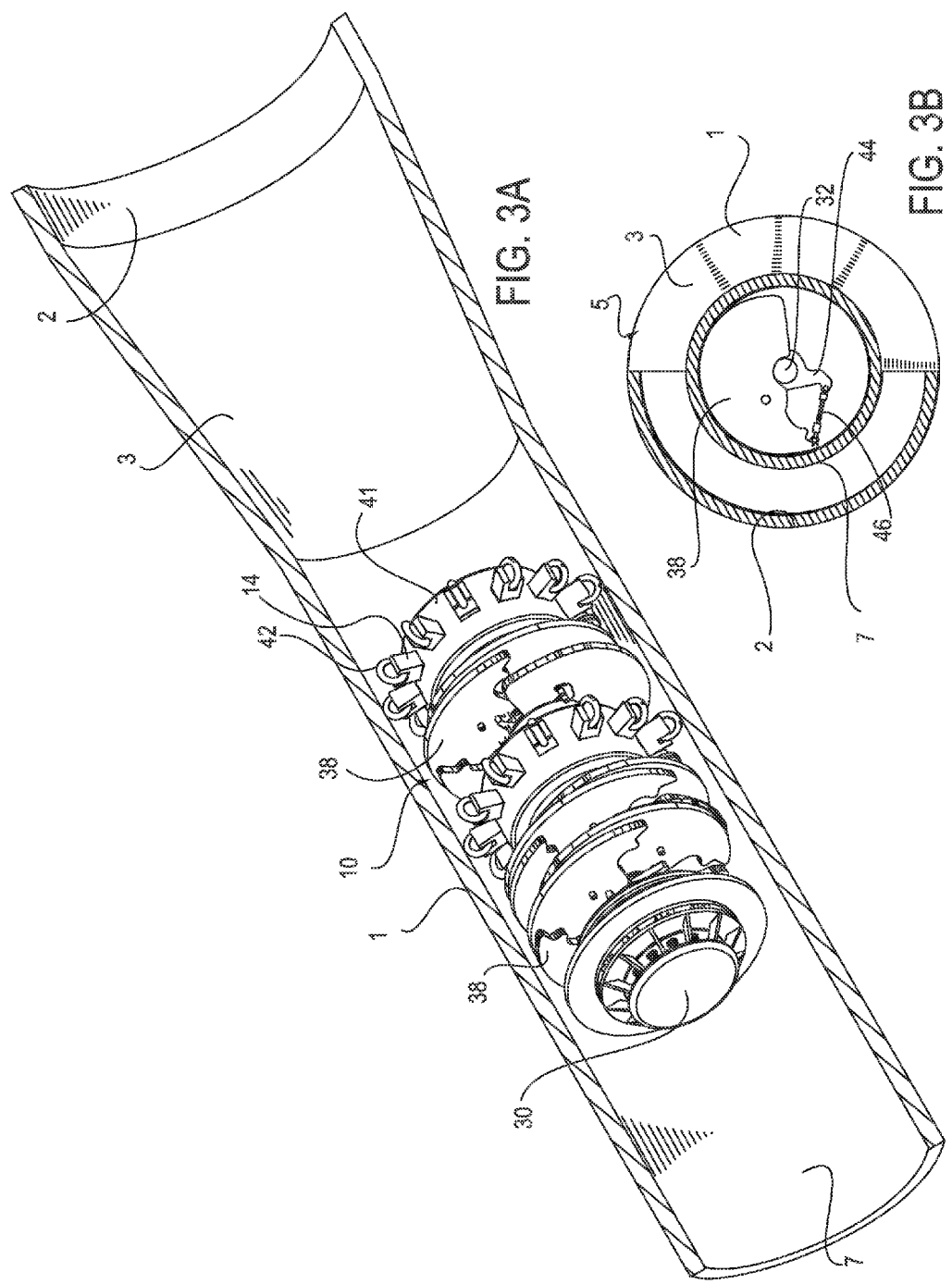

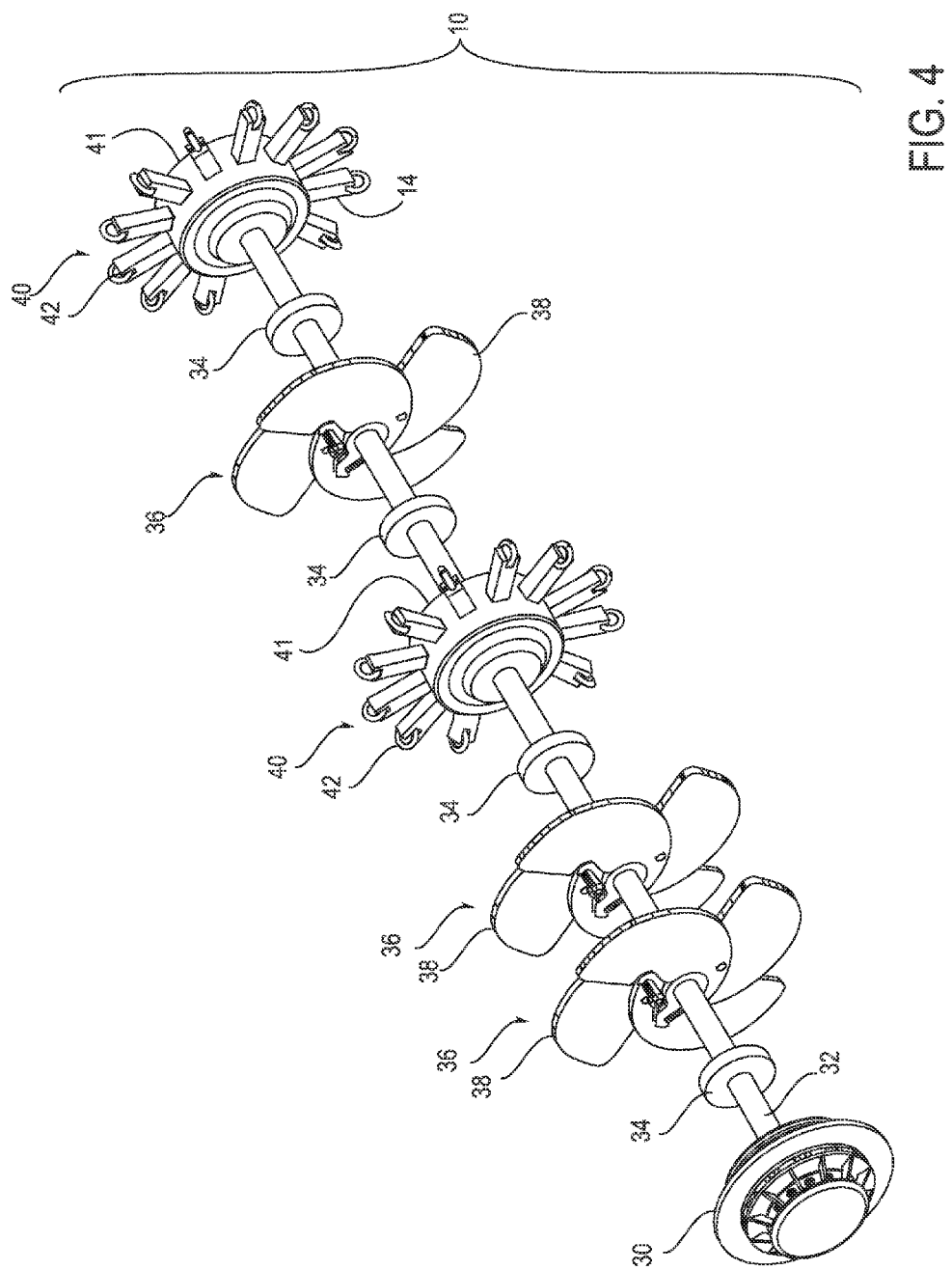

SYSTEMS FOR MAINTAINING A FUNCTIONAL LINE FOR CONVEYING FLUID AND PIG ASSEMBLIES FOR USE THEREIN

FIELD

The present disclosure relates to pig assemblies and methods and systems for maintaining subsea functional lines and/or risers.

BACKGROUND

As subsea hydrocarbon production systems have evolved over time, certain challenges have become more problematic. One challenge is that subsea pipeline systems now cover greater areas, therefore the pipelines must traverse greater distances. Pipeline system designers would like to have greater flexibility to utilize various sizes and types of subsea pipeline, particularly as systems become larger and more complex. Another challenge is that certain subsea production fields necessitate subsea pipeline crossing difficult geographical formations, including canyons, scarps and rough terrain. In these situations, it would frequently be desirable to utilize a flexible and/or lighter weight pipe or conduit with a different diameter for at least a portion of the pipeline system.

A consideration which often limits the pipeline system designer's ability to design pipeline systems adapted to such challenges is the piggability of the lines in the systems. It would be desirable to have the ability to maintain and service subsea pipeline systems including transitions between various types of pipe as well as various pipe diameters. Many such systems with a larger variation of diameter are not piggable with current technology. It would be desirable to provide pig assemblies capable of addressing the aforementioned challenges with the current technology.

SUMMARY

In one aspect, a pig assembly for servicing a multi-diameter functional line for conveying fluid is provided. The pig assembly includes a central shaft having a first shaft end and a second shaft end and at least one cylindrical pig body coaxially mounted on the central shaft. Attached to the at least one pig body are a plurality of arms capable of moving between an extended position radiating from the at least one pig body and a retracted position within the at least one pig body. Each of the pluralities of arms includes a spring to enable each arm of the plurality of arms to move into the extended position and to store potential energy when the arm is in the retracted position, and a roller to enable rolling contact between the pig assembly and an interior of a functional line during movement of the pig assembly within the functional line. The pig assembly further includes at least one set of a plurality of scraper elements located along the central shaft and spaced a predetermined distance from the at least one cylindrical pig body, the at least one set of a plurality of scraper elements being capable of rotating about the central shaft to move between an opened position and a collapsed position.

In another aspect, a method for maintaining a functional line for conveying fluid is provided which includes pigging a subsea line having at least a larger diameter functional line and a smaller diameter functional line in fluid communication with one another using a pig assembly as described herein.

DESCRIPTION OF THE DRAWINGS

These and other objects, features and advantages of the present invention will become better understood with reference to the following description, appended claims and accompanying drawings where:

FIG. 1A is a perspective, cutaway view of a pig assembly traveling through a pipe in a larger diameter section according to one exemplary embodiment.

FIG. 1B is a cross-sectional view of the pig assembly illustrated in FIG. 1A in extended mode.

FIG. 2A is a perspective, cutaway view of the pig assembly traveling through a section of the pipe in which the diameter transitions from one size to another.

FIG. 2B is a cross-sectional view of the pig assembly illustrated in FIG. 2A transitioning from extended to contracted mode.

FIG. 3A is a perspective, cutaway view of the pig assembly traveling through a smaller diameter section of the pipe.

FIG. 3B is a cross-sectional view of the pig assembly illustrated in FIG. 3A in a retracted mode.

FIG. 4 is a perspective, exploded view of the pig assembly.

DETAILED DESCRIPTION

Referring to the Figures, a pig assembly 10, also referred to herein as a pig 10, for servicing a multi diameter functional line 1 for conveying fluid will be described. In one embodiment, referring to the exploded view of FIG. 4, the pig assembly 10 includes a central shaft 32 having a first shaft end and a second shaft end. At least one cylindrical pig body element 40 is mounted on the central shaft 32. Each pig body element 40 includes a pig body 41 that is coaxially mounted on the central shaft 32. A plurality of arms 14 is attached to the at least one pig body 41. The plurality of arms 14 is capable of moving between an extended position as shown in FIG. 1A and FIG. 1B radiating from the at least one pig body 41, and a retracted position as shown in FIG. 3A and FIG. 3B within the at least one pig body 41. Each of the pluralities of arms 14 includes a spring (not shown) to enable each arm 14 of the plurality of arms to move into the extended position and to store potential energy when the arm is in the retracted position. Each arm of the pluralities of arms 14 also includes a roller 42 at the end thereof to enable rolling contact between the pig assembly 10 and an interior of a functional line 1 during movement of the pig assembly within the functional line. The plurality of arms acts to center the pig 10 in the functional line 1, thus enabling the pig to travel steadily along the functional line. The pluralities of arms 14 contract and expand automatically in reaction to the size and shape of the interior of the functional line.

In one embodiment, at least one of the rollers 42 further includes a sensor (not shown) located therein to collect information on the condition of the interior of the functional line. Suitable sensors include sensors designed to measure specific parameters such as wall thickness, crack dimensions, using specific techniques such as ultrasound, x-ray, magnetic flux, and the like. Other in line inspection tools can be used as would be apparent to one skilled in the art.

At least one set of a plurality of scraper elements 36 is located along the central shaft 32 and spaced a predetermined distance from the at least one cylindrical pig body 41. The at least one set of a plurality of scraper elements 36 is capable of rotating about the central shaft 32 to move between an opened, extended position as shown in FIG. 1A and FIG. 1B, and a collapsed position as shown in FIG. 3A and FIG. 3B.

In one embodiment, each scraper element 36 includes a scraper blade 38 formed of a pliable material having a size and shape such that in the opened position the at least one set of a plurality of scraper elements 36 has a first outer diameter corresponding to a maximum diameter of the functional line and in the collapsed position the at least one set of a plurality of scraper elements 36 has a second outer diameter less than the first diameter.

In one embodiment, each scraper element 36 further includes a clutch 44 rotatably mounted on the central shaft 32 and pivotally connected to the scraper blade 38 to determine the position of the scraper blade 38. The clutch 44 acts to move the scraper blade 38 across different position under the loading from a spring 46. The spring 46 has a first spring end connected to the clutch 44, e.g. to an eccentric tip of the clutch 44, and a second spring end connected to the scraper blade 38, e.g. to a tip of the scraper blade, to enable the scraper element 36 to move into the opened position and to store potential energy when the scraper element 36 is in the collapsed position. The spring 46 can have a spring constant such that when the at least one set of a plurality of scraper elements 36 is in the opened position, the scraper elements 36 contact the interior of the functional line. In one embodiment, the spring 46 is a spring loaded piston.

The spring 46 can be formed of an elastic material. For instance, the elastic material can be selected from the group consisting of polyethylene, polyvinyl chloride, polyamide, polyurethane, rubber, composite material, carbon fiber, pliable metal and combinations thereof.

In one embodiment, the scraper blades 38 can be reversibly inflatable, such that they are both inflatable and deflatable as desired for the given situation. The inflation and deflation can occur desirably in response to a change in diameter in the multi-diameter functional line 1 encountered by the pig assembly 10 during pigging. In one embodiment, the scraper blades 38 are inflated or deflated in response to a signal received by the pig assembly 10 upon arriving at a junction of two functional lines having differing diameters. The signal can be selected from the group consisting of an electrical signal, a mechanical signal, a magnetic signal and combinations thereof. In another embodiment, the scraper blades 38 are inflated by at least one pressurized canister containing a pre-pressurized fluid.

In one embodiment, each of the scraper blades 38 includes an internal skeleton structure having at least one predetermined outer diameter corresponding to at least one inner diameter of the multi-diameter functional line 1.

In one embodiment, the scraper blades 38 are tilted at an angle with respect to the central shaft 32.

In an alternative embodiment, not shown, the scraper blades can be connected to each other by a collapsible layer. The collapsible layer can be used to ensure cross-sectional sealing within the functional line when it is desired to prevent bypass of fluids around the pig.

In one embodiment, the movement between the extended position of the arms 14 (opened position of the scraper elements 36) and the retracted position of the arms 14 (collapsed position of the scraper elements 36) can be controlled remotely. For instance, hydraulic fluid, wireless signals, electrical signals and combinations thereof can be used as would be apparent to one skilled in the art. This control can be activated at the point at which the pig reaches a predetermined location, such as a station or a pipeline connection termination structure that connects two pipes with two different diameters. In another embodiment, the movement between the extended and the retracted positions of the scraper elements 36 can be controlled by pig body elements 41 first shaft end (not shown) and a pig body elements 41 located at the other end of the shaft. The control can be activated when the pig body plurality of arms elements 14 retract as the pig assembly 10 traverses a smaller size diameter or extend when the pig assembly 10 traverses a larger diameter size.

In one embodiment, the movement of the scraper blades 38 between the opened position and the collapsed position can be controlled independently for each set of scraper elements 36. Thus, not all sets of scraper elements 36 can be extended, such that the pressure difference that normally causes the pig to move forward is relieved and hence the pig can remain stationary when desired.

Between the components of the pig assembly 10 mounted on the central shaft 32, i.e., the scraper elements 36 and the pig body elements 40, are spacer elements 34, as can be seen in the exploded view of FIG. 4. An optional halo or nose 30 can be located at the forward end of the central shaft. The nose 30 can be located at both ends to enable bidirectional pig travel.

In one embodiment, the pig assembly 10 is advantageously capable of servicing a multi-diameter functional line 1 having at least a larger diameter segment that is more than twice the diameter of a smaller diameter segment. For example, a pig 10 according to the present disclosure is capable of servicing a functional line having one segment having a diameter of 10 inches and another segment having a diameter of 20 inches.

FIGS. 1A, 2A and 3A illustrate the pig assembly 10 traveling through a multi-diameter functional line, at different sections of the functional line 1. FIG. 1A illustrates the pig assembly 10 traveling through the larger diameter section 2 of the functional line, so that the arms 14 extending from the pig body elements 40 of the pig assembly 10 are in their extended position, and the scraper elements 36 are in their opened position. The section of the functional line 1 shown includes the larger diameter section 2 and a transition 3 to a narrower section 7 of the functional line. Reference numeral 5 refers to the exterior of the functional line 1. FIG. 1B illustrates a cross-sectional view of FIG. 1A from the narrower end.

FIG. 2A illustrates the pig assembly 10 traveling through the transition section 3 of the functional line, so that the arms 14 extending from the pig body elements 40 of the pig assembly 10 and the scraper elements 36 are in a partially retracted/collapsed position. The section of the functional line 1 shown includes the larger diameter section 2, a transition section 3, and a narrower section 7 of the functional line. FIG. 2B illustrates a cross-sectional view of FIG. 2A from the narrower end.

FIG. 3A illustrates the pig assembly 10 traveling through the narrower section 7 of the functional line, so that the arms 14 are retracted into the pig bodies 41, and the scraper elements 36 are in a collapsed position. FIG. 3B illustrates a cross-sectional view of FIG. 2A from the narrower end.

The functional lines 1 of the pipeline system can be onshore or subsea pipeline conveying oil and gas production fluids. Alternatively, the functional lines can be selected from oil recovery gas lines, gas lift lines, water lines, well service lines, well kill lines, scale squeeze lines, methanol lines, MEG lines and lines for tertiary recovery fluid, as would be familiar to those skilled in the art. The larger diameter functional line and the smaller diameter functional line can be separate sections of a functional line for conveying fluids where the larger diameter functional line and the smaller diameter functional line are in fluid communication with each other.

The larger diameter and smaller diameter functional lines 1 can be different types of pipe, wherein the types of pipe are selected from rigid pipe and engineered pipe. The engineered pipe can be bonded flexible pipe, unbonded flexible pipe or multilayered composite pipe.

In one embodiment, the larger diameter functional line can have a diameter of at least 5.1 cm. In one embodiment, the larger diameter functional line can have a diameter of from 5.1 cm to 102 cm. The smaller diameter functional line can have a smaller diameter than the larger functional line. In some embodiments, the diameters of the larger diameter functional line and the smaller diameter functional line differ by more than 1 standard API 5 L pipeline diameters. In some embodiments, the diameter of the larger diameter functional line is more than twice the diameter of the smaller diameter functional line. One of the functional line diameters can be at least 10.2 cm, even from 10.2 cm to 102 cm. Another of the functional line diameters can be at least 5.1 cm, even from 5.1 cm to 91.4 cm. Various combinations of pipeline diameters can be used. Thus, systems including a combination such as, for example, a functional line having a nominal pipe size (NPS) of 40 in (outer diameter of 101.6 cm) in fluid communication with a functional line having a NPS of 21 in (outer diameter of 53.0 cm) can be provided by the present disclosure. The present disclosure also provides other combinations, including, as nonlimiting examples, a functional line having a NPS of 40 in (outer diameter of 101.6 cm) in fluid communication with a functional line having a NPS of 16 in (outer diameter of 40.6 cm); a functional line having a NPS of 3½ in (outer diameter of 8.89 cm) in fluid communication with a functional line having a NPS of 6⅝ in (outer diameter of 16.8 cm); and a functional line having a NPS of 14 in (outer diameter of 35.6 cm) in fluid communication with a functional line having a NPS of 20 in (outer diameter of 50.8 cm). Regardless of the diameter difference between the larger diameter functional line and the smaller diameter functional line, the pig assembly 10 of the present disclosure can be used to pig the system while traversing pipeline sections of different inner diameters.

The pig assembly 10 can be propelled in the functional line 1 by the flow in the line, or the pig can be self-propelled by a motor within the pig. The motor can be powered by a battery, hydrogen cell, fluid pressure, pressure accumulator or radioactive source.

For simplicity, the figures herein illustrate larger diameter functional lines, e.g., larger diameter functional line, transitioning directly into smaller diameter functional lines, e.g., smaller diameter functional line. However, it is to be understood that a pipeline connection termination can be connected between the larger diameter functional lines and the smaller diameter functional lines. By "pipeline crossing termination" is meant a subsea structure such as a manifold capable of connecting to at least a first and a second functional line such that the first functional line and the second functional line are placed in fluid communication with one another. The subsea structure may be capable of isolating at least two functional lines connected to the subsea structure from one another. In some embodiments, a pipeline crossing termination can be located between the at least one riser and the at least one functional line on the seabed. In some embodiments, a pipeline crossing termination can be located between the first and second functional lines on the seabed. In some embodiments, the pipeline crossing termination can include a subsea pig launcher capable of housing at least one pig assembly 10 according to the present disclosure and introducing a pig 10 into a functional line 1. As previously described, the system can include at least one functional line and at least one riser, or at least a first and second functional line wherein one functional line has a larger diameter than the other. The pig 10 can travel in any direction and stop at any point through the system. Through pigging the system, the functional line(s) and/or the riser(s) of the system can be maintained.

In one embodiment, the smaller diameter functional line can be a riser attached to an offshore production platform for conveying fluid to the production platform. The riser can be in fluid communication with at least one functional line located on the seabed. The functional line diameter and the riser diameter differ by more than 1 standard API 5 L pipeline diameters, even by more than 2 standard API 5 L pipeline diameters. The functional line diameter can be at least 10.2 cm, even from 10.2 cm to 102 cm. The riser diameter can be at least 5.1 cm, even from 5.1 cm to 91.4 cm. Thus, systems including a combination such as, for example, a riser having a nominal pipe size (NPS) of 20 in (outer diameter of 50.8 cm) in fluid communication with a functional line having a NPS of 40 in (outer diameter of 101.6 cm) can be provided by the present disclosure. The present disclosure also provides other combinations, including, as nonlimiting examples, a riser having a NPS of 16 in (outer diameter of 40.6 cm) in fluid communication with a functional line having a NPS of 3½ in (outer diameter of 8.89 cm); and a riser having a NPS of 6⅝ in (outer diameter of 16.8 cm) in fluid communication with a functional line having a NPS of 14 in (outer diameter of 35.6 cm).

In some embodiments, the riser can have a length of at least 10 m, even of 10 m to 5000 m. The riser and the functional line can be different types of pipe, wherein the types of pipe are selected from rigid pipe and engineered pipe. The engineered pipe can be bonded flexible pipe, unbonded flexible pipe or multilayered composite pipe.

In some embodiments, the system can also include a third functional line such that the second functional line is located between the first and third functional lines. For example, the second functional line can cross a section of rough terrain, a subsea scarp or cliff, or a subsea canyon. Each of the first, second and third functional lines can have different diameters, or two of the three functional lines have diameters that differ by more than 1 standard API 5 L pipeline diameters.

By providing the ability to pig pipeline systems having differing pipeline diameters, the pig assembly 10 of the present disclosure is particularly useful to facilitate pipeline systems and pipeline installation in certain scenarios. In one such scenario, larger diameter pipelines can be installed on the seabed, and pipeline crossing terminations can be installed on the seabed connected to the larger diameter pipelines on each side of a subsea canyon. Extending between the pipeline crossing terminations, across the subsea canyon, can be two parallel lighter weight, smaller diameter flexible pipelines. In a similar scenario, pipeline crossing terminations can be installed on the seabed on each side of a subsea scarp or cliff with two parallel functional lines extending there between. In another scenario, a pipeline crossing termination can be installed on the seabed at a shallower water depth, and two parallel functional lines running in parallel with one another can extend into progressively deeper water. In yet another scenario, a pipeline crossing termination can be installed on the seabed at the base of a marine riser. In this embodiment, the pipeline crossing termination connects the two parallel functional lines running in parallel with one another on the seabed with the riser, which in turn is connected to an offshore production platform.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

From the above description, those skilled in the art will perceive improvements, changes and modifications, which are intended to be covered by the appended claims.

What is claimed is:

1. A pig assembly for servicing a multi-diameter functional line for conveying fluid, comprising:
   a. a central shaft having a first shaft end and a second shaft end;
   b. at least one cylindrical pig body coaxially mounted on the central shaft;
   c. a plurality of arms attached to the at least one pig body capable of moving between an extended position radiating from the at least one pig body and a retracted position within the at least one pig body; wherein each of the pluralities of arms comprises:
      i. a spring to enable each arm of the plurality of arms to move into the extended position and to store potential energy when the arm is in the retracted position; and
      ii. a roller to enable rolling contact between the pig assembly and an interior of a functional line during movement of the pig assembly within the functional line; and
   d. at least one set of a plurality of scraper elements located along the central shaft and spaced a predetermined distance from the at least one cylindrical pig body, the at least one set of a plurality of scraper elements capable of rotating about the central shaft to move between an opened position and a collapsed position.

2. The pig assembly of claim 1, wherein each scraper element comprises:
   a. a scraper blade formed of a pliable material having a size and shape such that in the opened position the at least one set of a plurality of scraper elements has a first outer diameter corresponding to a maximum diameter of the functional line and in the collapsed position the at least one set of a plurality of scraper elements has a second outer diameter less than the first diameter;
   b. a clutch rotatably mounted on the central shaft and pivotally connected to the scraper blade to determine the position of the scraper blade; and
   c. a spring having a first spring end connected to the clutch and a second spring end connected to the scraper blade to enable the scraper element to move into the opened position and to store potential energy when the scraper element is in the collapsed position.

3. The pig assembly of claim 2, wherein the spring has a spring constant such that when the at least one set of a plurality of scraper elements is in the opened position, the scraper elements of the at least one set of a plurality of scraper elements contact the interior of the functional line.

4. The pig assembly of claim 2, wherein the spring is a spring loaded piston.

5. The pig assembly of claim 2, wherein the spring is formed of an elastic material.

6. The pig assembly of claim 5, wherein the elastic material is selected from the group consisting of polyethylene, polyvinyl chloride, polyamide, polyurethane, rubber, composite material, carbon fiber, pliable metal and combinations thereof.

7. The pig assembly of claim 2, wherein the scraper blade is inflatable and deflatable.

8. The pig assembly of claim 7, wherein the scraper blade is inflated or deflated in response to a change in diameter in the multi-diameter functional line.

9. The pig assembly of claim 8, wherein the scraper blade is inflated or deflated in response to a signal received by the pig assembly upon arriving at a junction of two functional lines having differing diameters, wherein the signal is selected from the group consisting of an electrical signal, a mechanical signal, a magnetic signal and combinations thereof.

10. The pig assembly of claim 7, wherein the scraper blade is inflated by a pressurized canister containing a pre-pressurized fluid.

11. The pig assembly of claim 7, wherein the scraper blade further comprises an internal skeleton structure having at least one predetermined outer diameter corresponding to at least one inner diameter of the multi-diameter functional line.

12. The pig assembly of claim 2, wherein the scraper blades of the at least one set of a plurality of scraper elements are tilted with respect to the central shaft.

13. The pig assembly of claim 2, wherein the scraper blades of each of the at least one set of a plurality of scraper elements are connected to each other with a collapsible layer.

14. The pig assembly of claim 2, wherein movement of the scraper blades of the at least one set of a plurality of scraper elements between the opened position and the collapsed position is controlled remotely by a control mechanism selected from the group consisting of hydraulic fluid, wireless signal, electrical signal and combinations thereof.

15. The pig assembly of claim 2, wherein movement of the scraper blades between the opened position and the collapsed position of the at least one set of a plurality of scraper elements is controlled independently for each set of scraper elements.

16. The pig assembly of claim 1, wherein at least one of the rollers has a sensor therein to collect information on the condition of the interior of the functional line.

17. The pig assembly of claim 16, wherein the sensor measures wall thickness and/or crack dimensions using a techniques selected from the group consisting of ultrasound, x-ray, and magnetic flux.

18. The pig assembly of claim 1, wherein the pig assembly is capable of servicing a multi-diameter functional line having at least a larger diameter segment and a smaller diameter segment wherein the diameter of the larger diameter segment is more than twice the diameter of the smaller diameter segment.

19. The pig assembly of claim 1, wherein movement between the extended position and the retracted position of the plurality of arms is controlled remotely.

20. The pig assembly of claim 19, wherein movement between the extended position and a retracted position of the plurality of arms is controlled remotely by a control mechanism selected from the group consisting of hydraulic fluid, wireless signal, electrical signal and combinations thereof.

* * * * *